United States Patent [19]

Gates, Jr. et al.

[11] Patent Number: 5,369,989

[45] Date of Patent: Dec. 6, 1994

[54] MISFIRE DETECTION IN AUTOMOBILE ENGINE

[75] Inventors: Freeman C. Gates, Jr., Southfield, Mich.; Kyong M. Park, Thousand Oaks, Calif.; Niraj Gupta, Moorpark, Calif.

[73] Assignees: Ford Motor Company, Dearborn, Mich.; Kavlico Corporation, Moorpark, Calif.

[21] Appl. No.: 88,163

[22] Filed: Jul. 7, 1993

[51] Int. Cl.$^5$ .......................................... G01M 15/00
[52] U.S. Cl. .......................................................... 73/115
[58] Field of Search .................... 73/115, 116, 117.3; 364/431.03, 431.04, 431.08; 123/425, 676

[56] References Cited

U.S. PATENT DOCUMENTS

| | | | |
|---|---|---|---|
| 3,924,457 | 12/1975 | Oshima et al. | 73/116 |
| 4,083,234 | 4/1978 | Aono . | |
| 4,189,940 | 2/1980 | Hulls et al. | 364/431.03 |
| 4,329,732 | 5/1982 | Kavli . | |
| 4,388,668 | 6/1983 | Bell . | |

Primary Examiner—Robert Raevis
Attorney, Agent, or Firm—Poms, Smith, Lande & Rose

[57] ABSTRACT

A simple, reliable, compact and inexpensive automobile engine misfiring detection system includes a basic capacitive pressure transducer, attached to a bleeder pipeline equidistantly from each point where the exhaust manifold is attached to the engine, and made of two closely spaced insulating plates whose opposed faces contain conductive layers, and one of which plates is a flexible diaphragm of low mechanical hysteresis. The transducer is thus coupled to a variable exhaust gas pressure source which under normal operating conditions remains at a substantially constant pressure level. The output signal from the transducer has its high-frequency AC component attenuated by a low-pass filter, whose output in turn has its DC component substantially removed by capacitive blocking, after which the remaining AC output is then amplified by a circuit including an operational amplifier. This AC-amplified signal is then compared with a "reduced-magnitude average" reference signal (produced by an AC-to-DC conversion side-circuit followed by magnitude-level adjustment). The comparator output triggers a one-shot monostable multivibrator used to produce an on-off switching signal which operates an LED alarm signal notifying the driver of engine misfiring and also sends an electronic signal to the car's central processor.

19 Claims, 5 Drawing Sheets

FIG. 3

PRESSURE (PSIG)
NORMAL

FIG. 4

PRESSURE (PSIG)
DISCONTINUITIES

FIG. 5   $V_r, V_s$ INVERTED

FIG. 6

COMPARATOR
OUTPUT
U5A, PIN 1

FIG. 7

AMPLIFIER OUTPUT
NORMAL CONDITION (U6A, PIN 1)

FIG. 8

AMPLIFIER OUTPUT
ABNORMAL CONDITION (U6A, PIN 1)

MISFIRE DETECTION IN AUTOMOBILE ENGINE

FIELD OF THE INVENTION

This invention relates to practical detection of large abrupt changes in magnitude, called discontinuities, of exhaust gas pressure in conventional reciprocating internal combustion automobile engines, such as are occasioned by combustion misfirings.

BACKGROUND OF THE INVENTION

Under the leadership of a government agency, the EPA, and with the aid of modern vehicle electronics, most of the pollution from automobile exhausts has been eliminated. In a well-running car, engine fuel is burnt efficiently, producing in the process the normal exhaust gases.

In an engine that misfires, however, unburnt fuel is expelled as well, contributing measurably to atmospheric pollution. In addition, of course, misfiring causes a significant loss of power of the engine, and may result in severe damage to the engine.

A means of detecting misfiring in an engine is therefore very desirable, so that corrective action can be taken.

Back pressure in the exhaust system of a car increases with engine speed (measured in revolutions per minute or "rpm") and is relatively constant for a given rpm. For a V-8 engine, as an example, this pressure, measured just before the catalytic converter, goes up to 10 psig at the highest rpm, as shown in FIG. 3 below.

Figure 3:
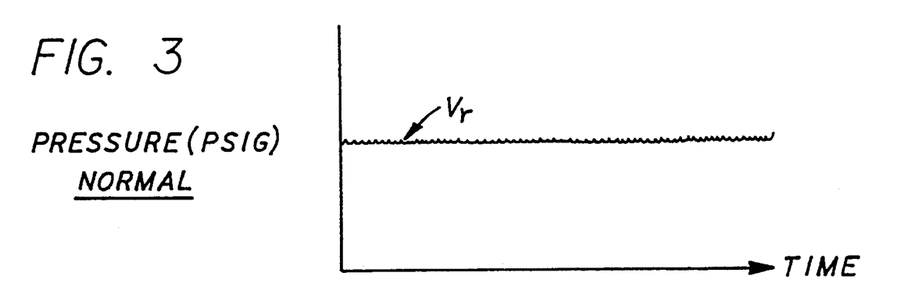
FIG. 3 is a typical measurement of normal exhaust gas pressure as a function of time, illustrating minor fluctuations in a substantially constant level of pressure.
Figure 4:
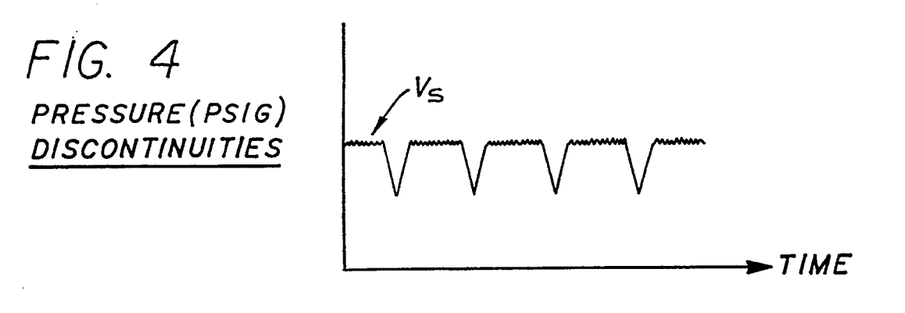
FIG. 4 is a time-plotted measurement of abnormal exhaust gas pressure in the presence of level discontinuities caused by repeated misfiring.

The continuous succession of firings in the car engine produces relatively small pressure pulsations around the back pressure, as shown in FIG. 3. In the event of a misfire the back pressure decreases from lack of enough exhaust from the misfiring cylinder and recovers its normal level when gasses from the cylinder that fires next are forced into the exhaust system, causing much larger pressure pulsations, as shown in FIG. 4. This difference between the amplitudes of normal and misfire pressure pulsations, hereinafter called a pressure discontinuity, forms the basis of the present invention for detection of misfires.

Accordingly there has been a need for a simple, compact, reliable and inexpensive real-time pressure discontinuity analysis system capable of detecting such exhaust-gas pressure abnormalities and alerting either a human operator or/and another automatic correction system to the occurrence of a misfire event.

While relatively expensive alarm systems of this type have been proposed, these tend to be complicated and to operate by indirect sensing methods which require sophisticated data-processing procedures and techniques in order to be of practical utility. For example, the "Method of and System for Detecting Misfire in Internal Combustion Engine", U.S. Pat. No. 4,083,234, issued Apr. 11, 1978 (and assigned to Nissan Motor Co., Ltd. of Japan), involves two separate indirect transducers, namely an acoustic transducer, such as an earphone receiver placed near the output of the engine exhaust gas, together with a rotary electromechanical engine-speed responsive frequency generator which produces a frequency variable proportional to the output speed of the engine. Furthermore, the signals from these two separate transducers must be processed by a fairly complicated electromechanical frequency analyzer (involving four separate band-pass filters, and two rotary contact mechanical elements operated at variable frequencies dependent upon engine speed).

It might be possible to apply the output of pressure transducers to suitably adjustable low-pass filters, having a high-frequency cut-off equal to the lowest firing frequency to be attenuated and a high-frequency band-pass maximized to the highest misfire frequency to be detected. Unfortunately the resultant filter design can be optimized only for a given engine rpm, and the development of an adaptive filter, whose frequency-domain shape varies with the engine rpm, though possibly realizable, is not believed to be the most practical or cost-effective approach.

Accordingly there has been a need for a more direct pressure-discontinuity analysis system, which utilizes only one transducer, namely a pressure transducer, and which operates successfully regardless of the values of other related variables (such as engine speed, in the present case of automobile engine misfiring detection systems), such as can be provided by a fixed-parameter passive RLC (Resistance, Inductance, Capacitance) analog circuitry, or a modified circuit of this type containing active elements whose characteristics are fixed independently of such external variables as engine speed.

Also there has been a need for an analysis system which does not include any rotating mechanical parts, and whose mechanical aspects are limited to the simple flexing of a diaphragm of low mechanical hysteresis, which simplification greatly improves reliability and extends lifetime durability, without need of scheduled service, and essentially eliminates the possibility of breakdown-mandated repairs.

SUMMARY OF THE INVENTION

In accordance with the principles of the present invention, there is provided a simple, reliable, compact and inexpensive automobile engine misfire detection system which includes a single basic capacitive pressure transducer, made of two closely spaced insulating plates whose opposed faces contain conductive layers, and one of which plates is a flexible diaphragm of low mechanical hysteresis.

Figure 7:
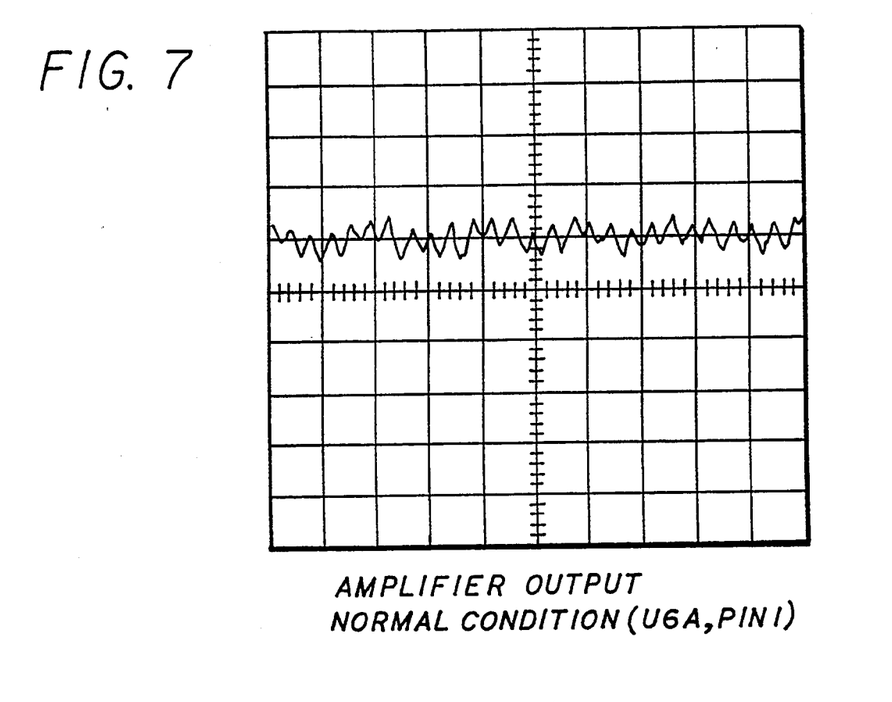
FIG. 7 is a plot versus time of a filtered exhaust gas pressure signal, measured during normal pressure conditions.
Figure 10:
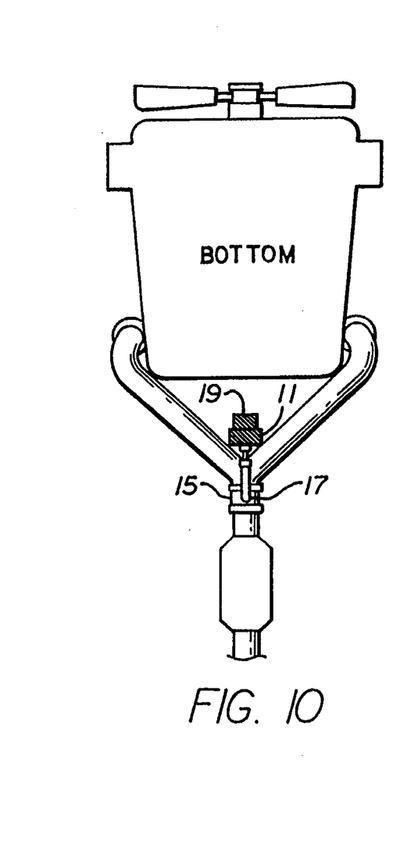
FIG. 10 is an illustration of a preferred placement and configuration of the attachment system to the pressure sensor of FIG. 2, in relation to the dual manifold confluent exhaust gas system of a type of automobile engine having a single catalytic converter and only one exhaust tailpipe.
Figure 11:
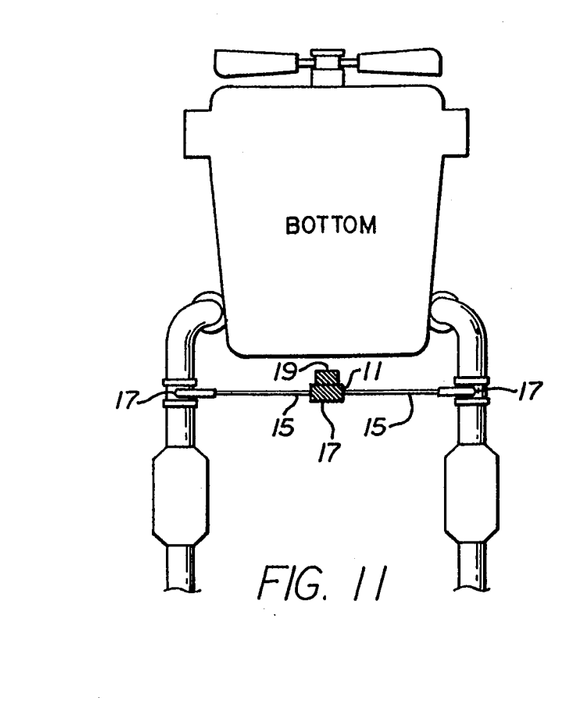
FIG. 11 is an illustration of a preferred placement and configuration of the attachment system to the pressure sensor of FIG. 2, in relation to the dual manifold parallel exhaust gas system of a type of automobile engine having dual catalytic converters and dual exhaust tailpipes.
Figure 12:
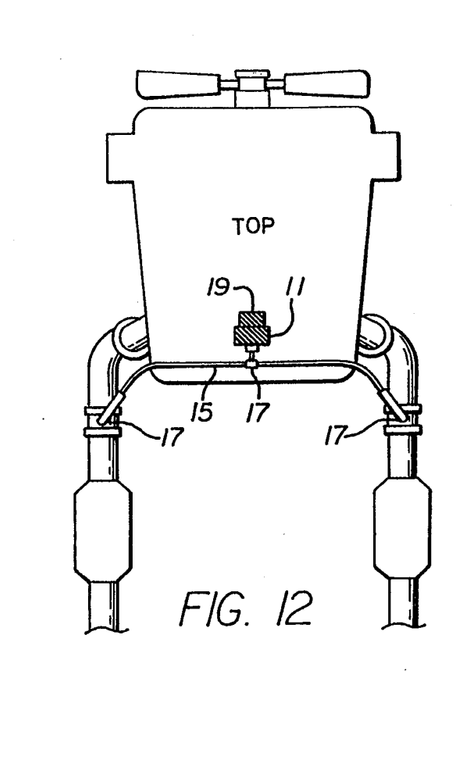
FIG. 12 is an illustration of an alternative preferred placement and configuration of the attachment system to the pressure sensor of FIG. 2, in relation to the dual manifold parallel exhaust gas output system of a type of automobile engine having dual catalytic converters and dual exhaust tailpipes.

The pressure pickup point in the exhaust system should be at a point in the exhaust system prior to the catalytic converter, as shown in FIG. 10 in the case of an automobile (such as the Cadillac on which the invention has been tested) having a single exhaust system exit. The pressure pickup point should be at a single common point on a system of bleeder pipelines for vehicles with multiple manifold exhaust systems, and the lengths of the several bleeder pipelines used to connect the various exhaust systems to a common point should be substantially equal. In the case of engines having dual exhaust manifold systems, as shown in FIG. 11 (which depicts a test on a Lincoln Continental) and FIG. 12 (which depicts a test on a Ford TownCar), the transducer is coupled to each engine exhaust manifold by two bleeder pipelines of substantially equal length, thus being coupled to a pressure source which under normal operating conditions remains at a substantially constant pressure level. (By a "substantially" constant pressure level is meant one with only minor fluctuations, such as are depicted in FIGS. 3 and 7, where "minor" means whatever is normal in the absence of actual misfirings; likewise, by "substantially" equal pipeline lengths is meant sufficient approximation to exact equality of length that the pressure sensor experiences "substantially" constant pressure in the absence of actual misfirings.)

The output of the transducer is operated upon by a fixed-gain, constant-parameter, time-independent active circuit composed of passive RC circuits combined with operational amplifiers ("op amps") and transistors.

The output signal from the transducer has its high-frequency AC component attenuated by a low-pass filter, whose output in turn has its DC component substantially removed by capacitive blocking, after which the remaining AC output is then amplified by a circuit which may include an operational amplifier. This AC-amplified signal is then compared with a "reduced-magnitude average" reference signal (produced by an AC-to-DC conversion side-circuit followed by magnitude-level adjustment). The comparator output triggers a one-shot monostable multivibrator used to produce an on-off switching signal which operates an LED alarm signal.

In accordance with a further aspect of the invention, a misfire detection and analysis system includes a pressure transducer for providing electrical signals corresponding to input pressure, a comparator, and a detection use circuit. Applied to the inputs of the comparator are an AC signal corresponding to the AC component of the output of the pressure transducer, and a DC reference signal which is a function of the average magnitude of the AC component of the output of the pressure transducer. Circuitry is also provided for energizing the detection use circuit only when a pressure discontinuity occurs, causing the AC component to exceed a predetermined level.

Other objects, features, and advantages will become apparent from a consideration of the following detailed description and from the accompanying drawings.

DETAILED DESCRIPTION

Figures 1, 2:
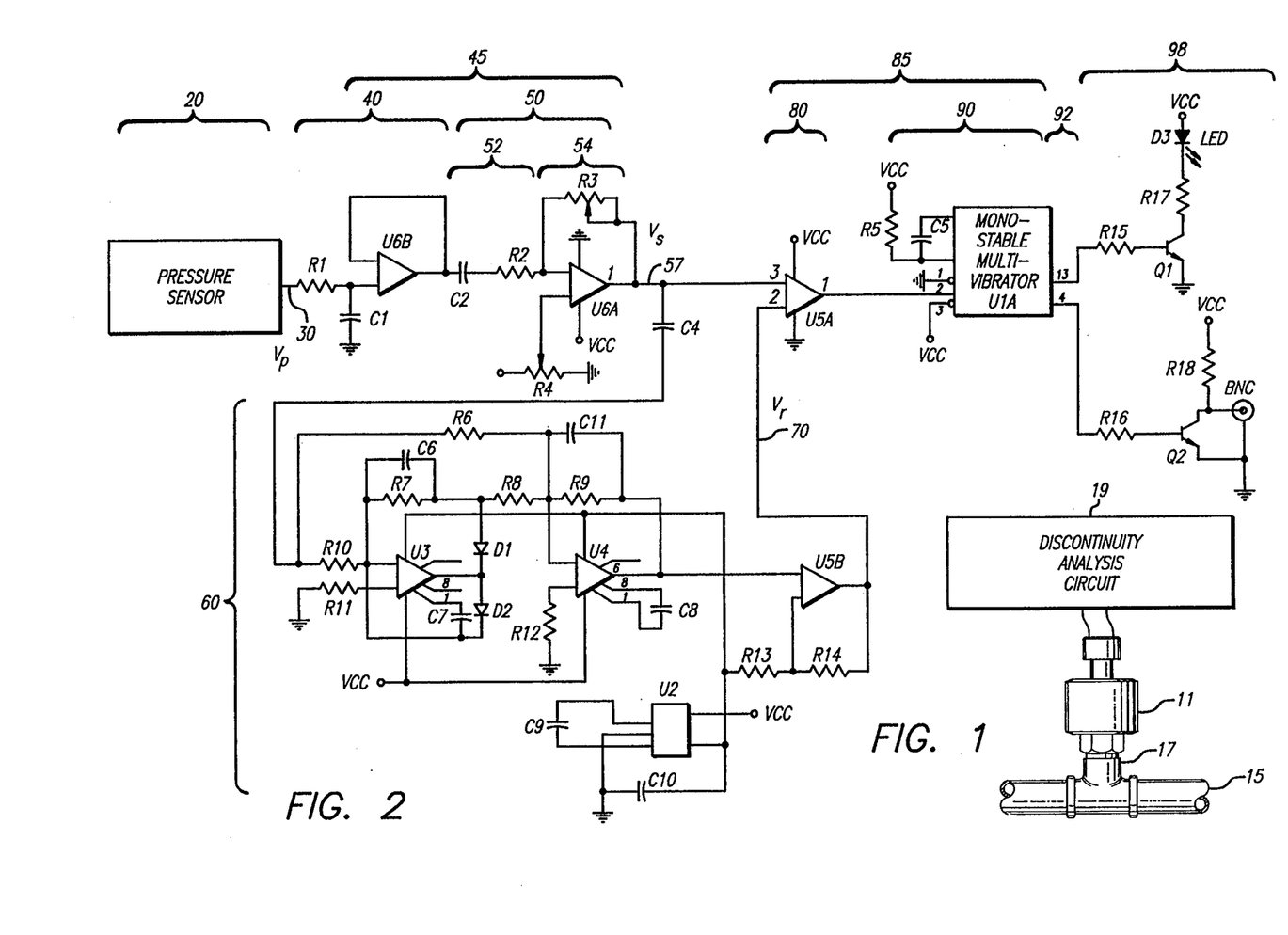
FIG. 1 is a partly schematic perspective view of an automobile engine misfire detection system illustrating the principles of the invention.
FIG. 2 is a schematic diagram of the misfire detection analysis system of FIG. 1.

Referring more particularly to the drawings, FIG. 1 shows a cylindrical pressure transducer 11 coupled to a fluid-carrying pipe 15 by a Tee-joint 17 and providing electrical output signals to the discontinuity analysis circuit 19 shown in greater detail in FIG. 2 (wherein the pressure transducer 11 is specialized to a capacitive pressure sensor 20). The presently preferred placement of these four components (numbered 11, 15, 17 and 19) in three different types of automobile engines is illustrated in FIG. 10 (for a Cadillac), in FIG. 11 (for a Lincoln Continental), and in FIG. 12 (for a Ford Town-Car). The requirements governing the choices of these arrangements have already been discussed above in the summary of the invention.

In the preferred embodiment of the present invention, the transducer 11 is of the type of a capacitive pressure sensor 20, such as are manufactured by Kavlico Corp., 14501 Los Angeles Ave., Moorpark, Calif. 93021 under such patents as U.S. Pat. No. 4,329,732, issued May 11, 1982 to Fred Kavli et al for "Precision Capacitance Transducer," and U.S. Pat. No. 4,388,668, issued Jun. 14, 1983 to Fred Kavli et al for "Capacitive Pressure Transducer." In these transducers there is an insulating plate closely spaced from a flexible insulating diaphragm of low mechanical hysteresis. The plate and diaphragm are coated on facing surfaces with a conductive layer; thus the capacitance between the plate and the diaphragm varies with the diaphragm's flexing, which is proportional to changes in the fluid pressure on the non-coated side of the diaphragm. This type of sensor is preferred because of its superior signal to noise ratio and because of its tailored time response characteristics. The sensor response time is roughly 5 to 10 milliseconds, which indicates that it would take about 5 to 10 milliseconds to shift 63% of the way from indicating one pressure level to indicating a new pressure level.

The output waveform of such a sensor in a normally running automobile exhaust gas output stream is presented in FIG. 3.

The same sensor, with abnormal pressure conditions produced by repeated engine misfirings, gives the output waveform presented in FIG. 4.

Figure 9:
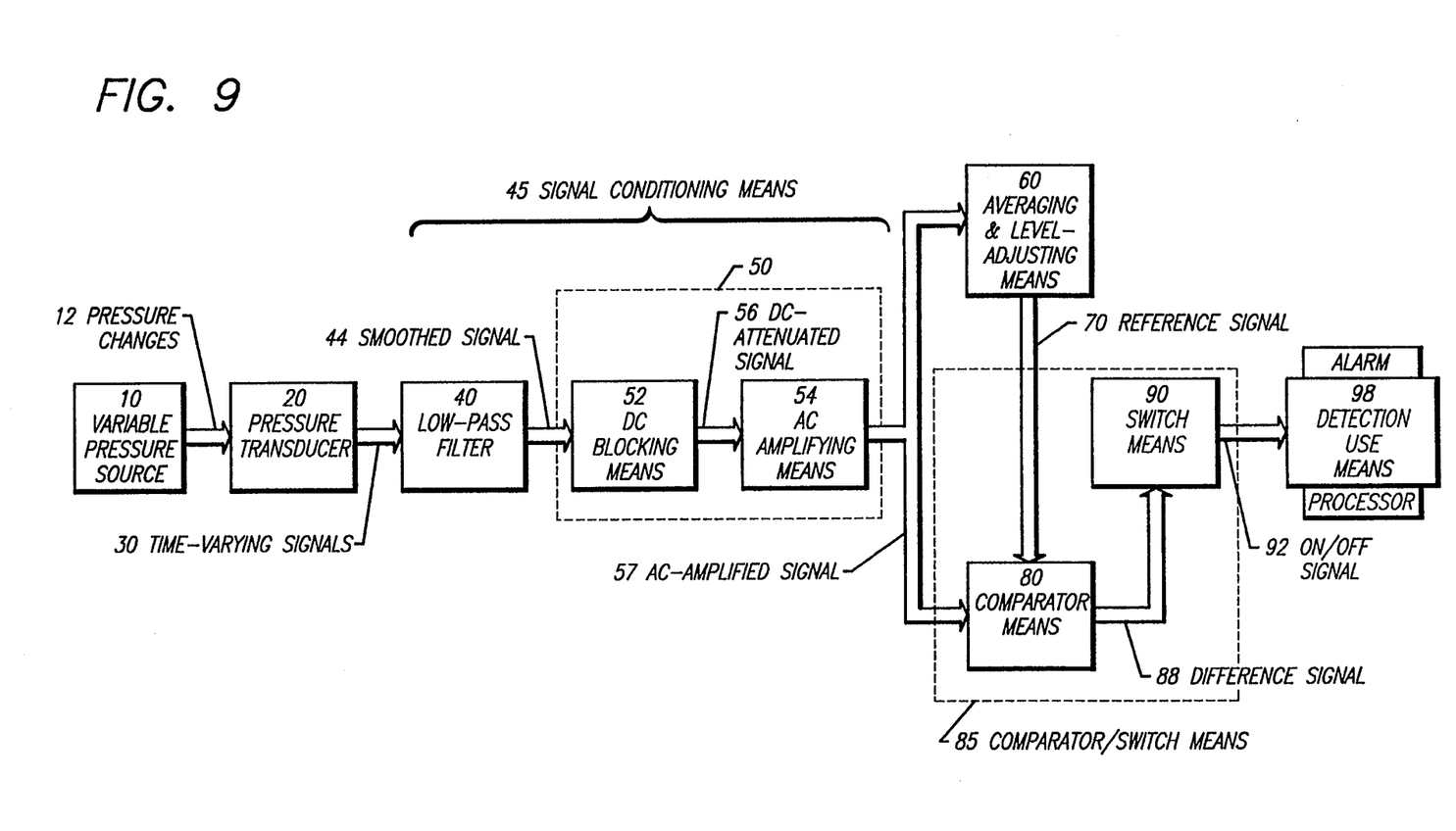
FIG. 9 is a schematic block diagram which depicts the information-theoretic architecture of the misfire detection system of FIG. 2.

Before discussing the particular details of the pressure discontinuity analysis circuit provided in FIG. 2, it may be helpful to the reader to consider the information-flow architecture of this circuit as presented in block-diagram form in FIG. 9. Here a variable pressure source 10 presents pressure changes 12 to a pressure transducer 20 whose output consists of time-varying signals 30. These signals are operated on by low-pass filter 40, which suppresses any extraneous high-frequency oscillations which may be present. The resultant smoothed signal is passed to a signal-conditioning sub-circuit 50, which consists of DC blocking circuit 52, producing a DC-attenuated signal 56, which is the input to AC-amplifying circuit 54. The result is the AC-amplified signal 56, which is both the input to comparator circuit 80 and averaging-and-level-adjusting circuit 60. The adjusted average provides reference signal 70, which is compared with AC-amplified signal 56 by comparator circuit 80. The difference signal 80 triggers switch circuit 90, which provides on/off signal 92 to detection use circuit 98. The preceding information-processing algorithm could be implemented by a digital filter or a hybrid digital-analog filter, but for simplicity and cost-effectiveness the preferred embodiment comprises the analog-circuit of FIG. 2, which will now be discussed in greater detail. (Operational amplifiers will be referred to as "op amps".)

The sensor output 30, denoted by "pressure voltage" $V_p$ as shown in FIG. 2, is filtered by a signal-conditioning circuit 45. In a presently preferred embodiment, this signal-conditioning circuit 45 comprises three sub-circuits: a low-pass filter 40, a DC-blocking filter 52, and an AC-amplifying circuit 54.

The low-pass filter 40 is comprised of resistor R1 (174 kilo-ohms) and capacitor C1 (0.1 micro-farads). The output of the low-pass filter is buffered by op amp U6B, and then subjected to the DC-blocking circuit 52, which is formed by capacitor C2 (0.47 micro-farads) and resistor R2 (200 kilo-ohms).

The resultant signal has its AC component amplified by the AC-coupled inverting amplifier 54 implemented by op amp U6A and its associated circuits, including resistors R3 (1 megohm) and R4 (10 kilo-ohms).

The output 56 of the conditioning circuit, denoted by "signal voltage" $V_s$, is shown in FIG. 2 as providing an input to both a comparator subsystem 85 (which includes a comparator 80 and a monostable multivibrator 90) and an averaging side-circuit 60.

The side-circuit 60 uses an AC-to-DC conversion circuit as a means of averaging the AC signal $V_s$ to produce a reference signal 70, denoted by "reference voltage" $V_r$, which is the other input to the comparator 80. The side-circuit 60 includes capacitors C4 (4.7 micro-farads), C6 (10 pico-farads), C7 (150 pico-farads), C8 (30 pico-farads), C9 (10 micro-farads), C10 (10 micro-farads), and C11 (4.7 micro-farads), together with resistors R6 (20 kilo-ohms), R7 (20 kilo-ohms), R8 (10 kilo-ohms), R9 (22.6 kilo-ohms), R10 (20 kilo-ohms), R11 (15 kilo-ohms), R12 (6.2 kilo-ohms), R13 (97 kilo-ohms), and R14 (23 kilo-ohms), as well as op amps U2, U3, U4, and U5B, and transistors D1 and D2.

The comparator 80 is based upon op amp U5A, and its output is the input to the switch circuit 90 implemented by monostable multivibrator (one-shot) U1A, which produces an output voltage pulse at the collectors of transistors Q1 and Q2 for every occurrence of a pressure discontinuity detection. The pulse duration is determined by the timing components of circuit 90, namely resistor R5 (50 kilo-ohms) and capacitor C5 (10 nano-farads). The output resistors R15 and R16 are both of 10 kilo-ohms resistivity. The resistor R17 (200 kilo-ohms) precedes transistor D3, which is a Light Emitting Diode (LED) and which is illuminated for the duration of the pulse at transistor Q1. The resistor R18 (1 kilo-ohm) is connected to the collector of transistor Q2 whose output may be monitored by a digital filter or microprocessor as indicated by the output connector BNC.

As shown in FIG. 2, the sensor output $V_p$ is filtered by a low-pass filter 40, formed by R1 and C1, to attenuate very high-frequency oscillations of the type which may occur during normal operation and are of no consequence for discontinuity detection or reference level determination, The filtered signal is buffered by op amp U6B and coupled through capacitor C2 to an inverting amplifier U6A. AC coupling is used to block the DC level of the sensor. The gain of the amplifier 54 is set by resistor R3 to give a suitable peak-to-peak voltage at the output (U6A pin 1), the DC level at the output of the amplifier being set by resistor R4.

Figure 8:
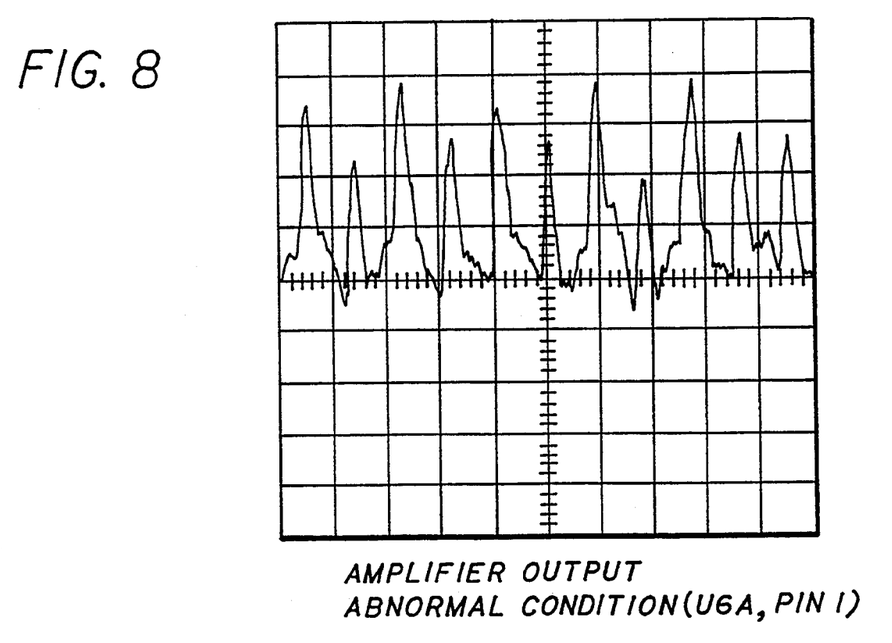
FIG. 8 is the same as FIG. 7 except that the measurement has been done during repeated misfirings.

The output $V_s$, of the amplifier U6A, shown in the plots of FIGS. 7 and 8, is applied to the non-inverting input of the comparator 80 (U5A pin 3). The same signal $V_s$ is coupled via capacitor C4 to an AC-to-DC converter circuit. The DC output of this circuit, appearing on pin 6 of U4, is level-shifted by op amp U5B and then applied on lead 70 to the inverting input of the comparator 80 (U5A pin 2) to serve as a reference voltage $V_r$. The comparator output (U5A pin 1) acts as a trigger for the monostable multivibrator U1A. The one-shot circuit U1A produces a pulse output on output pins 4 and 13 on every positive-going voltage transition on its input on pin 2.

For the case of normal operating conditions, not shown in the plots of the drawings, the signal $V_r$ is lower than the bottom peak of $V_s$, and the output of the comparator stays high and there is no output from the one-shot. This would correspond to a plot of the type of FIG. 5 wherein the inverted signal $V_s$ would be represented by a fluctuating but almost constant-level straight line beneath the inverted reference signal $V_r$; in this case, the comparator would never send an output pulse.

Figure 5:
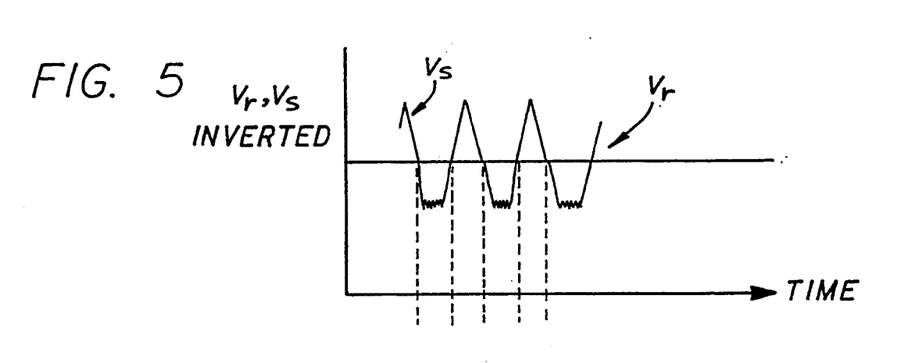
FIG. 5 is a plot versus time of a reference voltage representing average exhaust gas pressure, and a filtered signal representing instantaneous exhaust gas pressure, including pressure discontinuities caused by misfiring.
Figure 6:
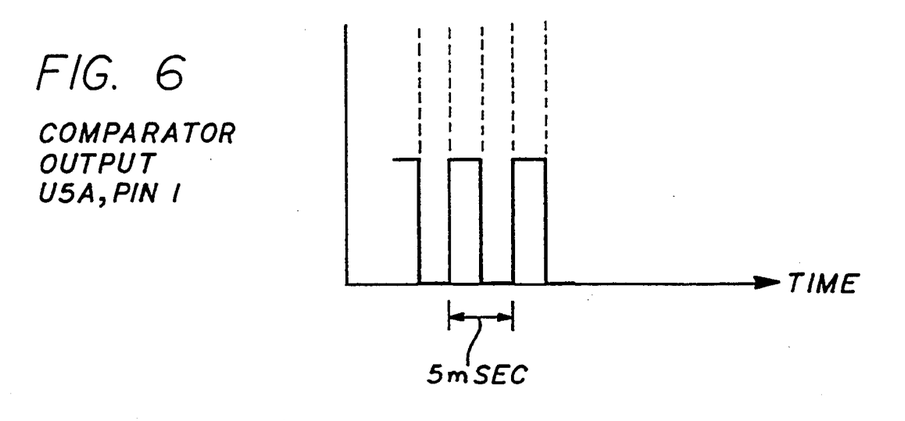
FIG. 6 is a plot versus time of the corresponding output of a comparator of a reference signal and a filtered exhaust gas pressure signal.

For abnormal conditions, involving pressure discontinuities due to engine misfiring, the amplitude of $V_s$ is larger, causing $V_r$ to increase and the bottom peak of $V_s$ to move lower as shown in FIG. 5 and the corresponding FIG. 6, wherein the pulse-width is about 0.5 milliseconds and the time between rising pulse edges is about 5 milliseconds in one example tested of a misfiring automobile engine at 6,000 rpm. At the crossover points of signal voltage $V_s$ and reference voltage $V_r$ the comparator switches state, producing a square wave at its output. The positive-going pulse on output pin 13 of the circuit U1A turns transistor Q1 to its ON state, lighting up the LED for the duration of the pulse. This blink of the LED serves as a visual indicator of the abnormal pressure discontinuity event. The negative-going pulse on output pin 4 of circuit U1A is inverted by transistor Q2 to produce a positive-going pulse at its collector. This pulse can be monitored by a central processor coupled to the output collector labeled BNC.

In conclusion, it is to be understood that the foregoing detailed description, and the accompanying drawings relate to the presently preferred illustrative embodiment of the invention. However, various changes may be made without departing from the spirit and the scope of the invention. Thus, by way of example and not of limitation, the transducer per se may be made of other materials than those mentioned hereinabove. Furthermore, it is possible to use a variable-resistivity sensor instead of a variable-capacitance sensor; for example, the facing surfaces of the plate and diaphragm can be coated with film resistive layers whose resistivity changes as the diaphragm is flexed. In addition, the parts need not have the precise configuration described hereinabove, but may have alternative arrangements. Further, instead of the structural parts being made of metal, they may in many cases be formed of high strength composite materials. The analog circuit of FIG. 2 may be replaced by a functionally equivalent hybrid analog-digital filter or purely digital filter having the same information-theoretic architecture, as depicted in FIG. 9. Also a threshold device can be inserted between the comparator and the monostable multivibrator, in order to reduce the detection sensitivity to minor pressure discontinuities; and this threshold device can be operated either upon an absolute threshold level-setting, or upon a relative level-setting which depends upon the level of the reference signal and varies as that signal varies; and such a circuit could be used to supplement or in place of the circuit 60 of FIG. 9. Accordingly, it is to be understood that the detailed description and the accompanying drawings as set forth hereinabove are not intended to limit the breadth of the present invention, which should be inferred only from the following claims and their appropriately construed legal equivalents, rather than from the example given.

What is claimed is:

1. A real-time automobile engine misfiring detection system, applicable to an exhaust gas pressure of an exhaust manifold means of an engine which, except for small magnitude fluctuations, is normally substantially constant or within a narrow range, comprising:

exhaust gas pressure transducer means for converting pressure changes into time-varying electrical signals, Said transducer means comprising a capacitive pressure transducer attached to a bleeder pipeline substantially equidistantly from each point where the exhaust manifold means is attached to the engine, said transducer means including an insulating plate and an insulating diaphragm, having facing sides coated with a conductive layer, said transducer means having a time constant in a range of 8 to 12 milliseconds;

low-pass filter means, said time-varying electrical signals being applied to said low-pass filter means, for suppressing high-frequency oscillations of said time-varying electrical signals to produce a filtered signal;

DC blocking means, coupled to an output of said low-pass filter means, for substantially removing a direct current component of said filtered signal to produce a DC-blocked filtered signal;

AC amplifying means, coupled to an output of said DC blocking means, for amplifying an alternating current component of said DC-blocked filtered signal to produce an AC signal voltage;

reference voltage producing means, coupled to an output of said AC amplifying means, for generating a DC reference voltage proportional to an average magnitude of said alternating current component during a normal continuous variation of the exhaust gas pressure, said reference voltage producing means including AC-to-DC conversion means for converting said AC signal voltage into a DC reference signal which is a function of said average magnitude and level-adjusting means for adjusting said DC reference signal to produce said DC reference voltage to be smaller in magnitude than said average magnitude;

comparator means, having one input coupled to said AC amplifying means and another input coupled to said reference voltage producing means, for comparing said AC signal voltage of said AC amplifying means with said DC reference voltage, including a detection of an algebraic sign of a difference between said AC signal voltage and said DC reference voltage and a production of an output signal whose magnitude is not zero when said difference has a selected sign and whose magnitude is zero when said difference has an opposite sign, and for providing an output pulse whenever said magnitude of said output signal changes from zero to a selected polarity, thereby indicating an occurrence of a significant pressure discontinuity;

bistable switch means for providing an on-off signal, coupled to an output of said comparator, and providing an output signal of preselected duration when said output pulse is received from said comparator; and detection use means, coupled to said bistable switch means, for providing a detection use signal upon an operation of said bistable switch means.

2. The real-time automobile engine misfiring detection system of claim 1 wherein said detection use means comprise alarm means triggered by an on state of said bistable switch.

3. The real-time automobile engine misfiring detection system of claim 2 wherein said alarm means include a light-emitting diode.

4. The real-time automobile engine misfiring detection system of claim 2 wherein said alarm means provide an alarm signal to an input of a digital processor which includes memory storage means for retaining information from said alarm signal.

5. An automobile engine misfiring detection system, applicable to an exhaust gas pressure of an exhaust manifold means of an engine which, except for small magnitude fluctuations, is normally substantially constant or within a narrow range, comprising:

exhaust gas pressure transducer means for converting pressure changes into time-varying electrical signals;

low-pass filter means, said time-varying electrical signals being applied to said low-pass filter means, for suppressing high-frequency oscillations of said time-varying electrical signals to produce a filtered signal;

DC blocking means, coupled to an output of said low-pass filter means, for substantially removing direct current component of said filtered signal to produce a DC-blocked filtered signal;

AC amplifying means, coupled to an output of said DC blocking means, for amplifying an alternating current component of said DC-blocked filtered signal to produce an AC signal voltage;

reference voltage producing means, coupled to an output of said AC amplifying means, for generating a DC reference voltage proportional to an average magnitude of said alternating current component during a normal continuous variation of said exhaust gas pressure;

comparator means, having one input coupled to said AC amplifying means and another input coupled to said reference voltage producing means, for comparing said AC signal voltage of said AC amplifying means with said DC reference voltage, and for producing an output pulse when a significant pressure discontinuity occurs;

bistable switch means for providing an on-off signal, coupled to an output of said comparator, and providing an output signal when said output pulse is received from said comparator; and detection use means, coupled to said bistable switch means, for providing a detection use signal upon an operation of said bistable switch means.

6. The automobile engine misfiring detection system of claim 5 wherein said detection use means comprise alarm means triggered by an on state of said bistable switch.

7. The automobile engine misfiring detection system of claim 6 wherein said alarm means include a light-emitting diode.

8. The automobile engine misfiring detection system of claim 6 wherein said alarm means provide an alarm signal to an input of a digital processor which includes memory storage means for retaining information from said alarm signal.

9. The automobile engine misfiring detection system of claim 5 wherein said reference voltage producing means comprise AC-to-DC conversion means for converting said AC signal voltage into an AC reference signal which is a function of said average magnitude and level-adjusting means for adjusting said DC reference signal to produce said AC reference voltage to be different in magnitude than said average magnitude;

10. The automobile engine misfiring detection system of claim 5 wherein said exhaust gas pressure transducer means comprise a capacitive pressure transducer attached to a bleeder pipeline substantially equidistantly from each point where the exhaust manifold means is attached to the engine, said transducer means including an insulating plate and a flexible insulating diaphragm of low mechanical hysteresis, having facing sides coated with a conductive layer.

11. The automobile engine misfiring detection system of claim 10 wherein a time-constant of said transducer means is selected within a range of 8 to 12 milliseconds.

12. The automobile engine misfiring detection system of claim 10 wherein said plate and said diaphragm are spaced apart between 0.001 and 0.0015 inches, and wherein said diaphragm has a thickness of about 0.0145 inches.

13. An automobile engine misfiring detection system, applicable to an exhaust gas pressure of an exhaust manifold means of an engine which, except for small magnitude fluctuations, is normally substantially constant or within a narrow range, comprising:

exhaust gas pressure transducer means for converting pressure changes into time-varying electrical signals;

signal conditioning means for suppressing DC components and amplifying AC components of said time-varying electrical signals to produce an AC signal voltage;

reference voltage producing means, coupled to an output of said signal conditioning means, for generating a DC reference voltage proportional to an average magnitude of said AC components during a normal continuous variation of said exhaust gas pressure;

circuit means, including a comparator having two inputs, for providing an on-off signal, said comparator having one input coupled to said signal conditioning means and another input coupled to said reference voltage producing means, for comparing said AC signal voltage of said signal conditioning means with said DC reference voltage, and for producing an output on-state signal when a significant pressure discontinuity occurs, said comparator being insensitive to a minor pressure and corresponding signal variations but producing said output on-state signal upon major pressure discontinuities; and detection use means, coupled to said circuit means, for providing a detection use signal upon a reception of said output on-state signal from said circuit means.

14. The automobile engine misfiring detection system of claim 13 wherein said detection use means comprise alarm means triggered by said output on-state signal from said comparator.

15. The automobile engine misfiring detection system of claim 14 wherein said alarm means include a light-emitting diode.

16. The automobile engine misfiring detection system of claim 14 wherein said alarm means provide an alarm signal to an input of a digital processor which includes memory storage means for retaining information from said alarm signal.

17. The automobile engine misfiring detection system of claim 13 wherein said reference voltage producing means comprise AC-to-DC conversion means for converting said AC signal voltage into a DC reference signal which is a function of said average magnitude and to be different in magnitude than said average magnitude;

18. The automobile engine misfiring detection system of claim 13 wherein said exhaust gas pressure transducer means comprise a capacitive pressure transducer attached to a bleeder pipeline substantially equidistantly from each point where the exhaust manifold means is attached to the engine, said transducer means including an insulating plate and an insulating diaphragm, having facing sides coated with a conductive layer.

19. The automobile engine misfiring detection system of claim 13 wherein the engine is a V-style engine and the exhaust manifold means include two bleeder pipelines, and wherein said transducer means are coupled substantially equidistantly from the engine.

* * * * *